US012414667B2

(12) United States Patent
Joynt

(10) Patent No.: US 12,414,667 B2
(45) Date of Patent: Sep. 16, 2025

(54) APPLICATION OF CLEANING SOLUTION ON A SURFACE MAINTENANCE MACHINE

(71) Applicant: Tennant Company, Eden Prairie, MN (US)

(72) Inventor: Daniel L. Joynt, Minneapolis, MN (US)

(73) Assignee: TENNANT COMPANY, Minneapolis, MN (US)

( * ) Notice: Subject to any disclaimer, the term of this patent is extended or adjusted under 35 U.S.C. 154(b) by 156 days.

(21) Appl. No.: 17/189,747

(22) Filed: Mar. 2, 2021

(65) Prior Publication Data

US 2021/0282616 A1 Sep. 16, 2021

Related U.S. Application Data

(60) Provisional application No. 62/990,229, filed on Mar. 16, 2020.

(51) Int. Cl.
*A47L 11/10* (2006.01)
*A47L 11/18* (2006.01)
(Continued)

(52) U.S. Cl.
CPC ......... *A47L 11/4088* (2013.01); *A47L 11/282* (2013.01); *A47L 11/4041* (2013.01);
(Continued)

(58) Field of Classification Search
CPC . B08B 3/02; A47L 11/00; A47L 11/22; A47L 11/24; A47L 11/26; A47L 11/28;
(Continued)

(56) References Cited

U.S. PATENT DOCUMENTS 4,295,244 A * 10/1981 Herpers .................. E01H 1/103 210/522
5,411,716 A * 5/1995 Thomas .................. B01F 21/00 422/264
(Continued)

FOREIGN PATENT DOCUMENTS

EP 3263236 A1 * 1/2018 .......... A47L 11/4002
EP 3501363 A1 6/2019
(Continued)

OTHER PUBLICATIONS

"Potentiometer," Wikipedia (Feb. 13, 2019), retrieved from Internet Archive, available at: https://web.archive.org/web/20190213012929/https://en.wikipedia.org/wiki/Potentiometer (Year: 2019).*
(Continued)

*Primary Examiner* — Kaj K Olsen
*Assistant Examiner* — Richard Z. Zhang
(74) *Attorney, Agent, or Firm* — Fredrikson & Byron, P.A.

(57) ABSTRACT

A surface maintenance machine comprises a surface maintenance head assembly with attached surface maintenance tool for collecting debris/fluid using a fluid delivery/recovery system. Embodiments include an outlet nozzle configured to dispense cleaning fluid exiting the outlet nozzle on the surface maintenance tool. The outlet nozzle is fluidly connected to a cleaning fluid source which can vary the intensity of cleaning fluid exiting the outlet nozzle such that different intensities of the cleaning fluid correspond to the cleaning fluid being dispensed on different areas of the surface maintenance tool. Embodiments also include a second outlet nozzle, located opposite the first, which is configured to dispense cleaning fluid exiting the outlet nozzle on the surface maintenance tool. Further embodiments include a pump which can vary the intensity of cleaning fluid exiting
(Continued)

the outlet nozzle in a cyclical manner and suspend the cleaning fluid from exiting the outlet nozzle.

15 Claims, 9 Drawing Sheets

(51) Int. Cl.

| | |
|---|---|
| ***A47L 11/282*** | (2006.01) |
| ***A47L 11/40*** | (2006.01) |
| ***B05B 12/00*** | (2018.01) |
| ***B05B 12/18*** | (2018.01) |
| ***B05B 13/00*** | (2006.01) |
| ***B08B 1/12*** | (2024.01) |
| ***B08B 1/30*** | (2024.01) |
| ***B08B 1/40*** | (2024.01) |
| ***B08B 1/52*** | (2024.01) |

(52) U.S. Cl.
CPC ............ *A47L 11/4083* (2013.01); *B08B 1/40* (2024.01); *B08B 1/52* (2024.01); *A47L 11/10* (2013.01); *A47L 11/185* (2013.01); *A47L 11/4072* (2013.01); *B05B 12/00* (2013.01); *B05B 12/18* (2018.02); *B05B 13/005* (2013.01); *B08B 1/12* (2024.01); *B08B 1/30* (2024.01)

(58) Field of Classification Search
CPC .......... A47L 11/29; A47L 11/34; A47L 11/03; A47L 11/4083; A47L 11/292; A47L 11/293; A47L 11/294; A47L 11/302; A47L 11/305; A47L 11/307; E01H 1/10–108
See application file for complete search history.

(56) References Cited

U.S. PATENT DOCUMENTS

| | | | | |
|---|---|---|---|---|
| 5,715,565 A * | 2/1998 | Kern | A47L 9/02 15/322 |
| 6,524,386 B1 * | 2/2003 | Slager, Sr. | A47L 11/4088 118/305 |
| 7,272,870 B2 * | 9/2007 | Pierce | A47L 11/4083 15/322 |
| 9,585,536 B2 | 3/2017 | Pi et al. | |
| 2003/0019069 A1 | 1/2003 | Field et al. | |
| 2012/0151696 A1 * | 6/2012 | Hamblin | A47L 11/4069 15/4 |
| 2017/0119225 A1 * | 5/2017 | Xia | A47L 11/302 |
| 2019/0343363 A1 * | 11/2019 | Stuchlik | A47L 11/293 |

FOREIGN PATENT DOCUMENTS

| | | |
|---|---|---|
| EP | 3566631 A1 | 11/2019 |
| WO | 2005107563 A1 | 11/2005 |

OTHER PUBLICATIONS

International Search Report and Written Opinion for International Application No. PCT/US2021/022529, dated Aug. 11, 2021, 17 pgs.
Partial International Search Report for International Application No. PCT/US2021/022529, dated Jun. 18, 2021, 9 pgs.

* cited by examiner

APPLICATION OF CLEANING SOLUTION ON A SURFACE MAINTENANCE MACHINE

CROSS-REFERENCE TO RELATED APPLICATION

This application claims the benefit of U.S. Provisional Application No. 62/990,229, filed Mar. 16, 2020, the content of which is hereby incorporated by reference in its entirety.

TECHNICAL FIELD

This disclosure relates to cleaning systems and techniques, particularly for cleaning floor surfaces.

BACKGROUND

Floor cleaning in public, commercial, institutional, and industrial buildings has led to the development of various specialized floor cleaning machines, such as hard and soft floor cleaning machines. Representative hard floor surfaces include tile, concrete, laminate (e.g., Formica®), natural and artificial wood, and the like. A representative soft floor surface is carpet. These cleaning machines generally utilize a cleaning head that includes one or more cleaning tools configured to perform the desired cleaning operation.

For example, an operator can run a hard surface scrubber over a floor. The scrubber can dispense a liquid cleaning fluid on the floor surface, agitate the fluid against the surface using one or more brushes, and then extract the fluid containing debris off the floor using a squeegee that is pulled along behind the brushes. Periodically, the operator can use a separate burnisher to polish the floor surface.

SUMMARY

In one aspect, this disclosure is directed to a surface maintenance machine that uses a cleaning fluid on a surface, comprising a body, wheels supporting the body for movement over the surface, and a maintenance head assembly supported by the body. The maintenance head assembly extending toward the surface and comprising a tool for performing a surface maintenance operation using the cleaning fluid. The surface maintenance machine further comprising an outlet nozzle configured to dispense the cleaning fluid exiting the outlet nozzle on the tool, and a cleaning fluid source. The cleaning fluid source carried by the body and fluidly connected to the outlet nozzle to supply cleaning fluid to the outlet nozzle. The outlet nozzle positioned relative to the tool such that different intensities of cleaning fluid exiting the outlet nozzle correspond to cleaning fluid dispensed on corresponding different areas of the tool. The cleaning fluid source configured to vary an intensity of the cleaning fluid exiting the outlet nozzle to at least two different intensities to dispense fluid on at least two corresponding areas of the tool.

The details of one or more examples are set forth in the accompanying drawings and the description below. Other features, objects, and advantages will be apparent from the description and drawings, and from the claims.

DETAILED DESCRIPTION

Figure 1A:
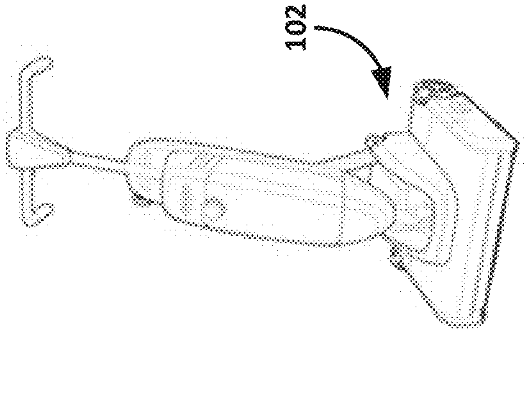
FIG. 1A-1C illustrate three example mobile platforms on which a system to pulse modulate cleaning solution to a surface maintenance tool according to the disclosure can be mounted and used.
Figure 1B:
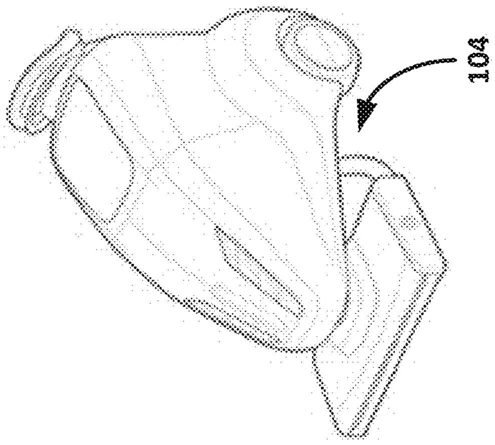
Figure 1C:
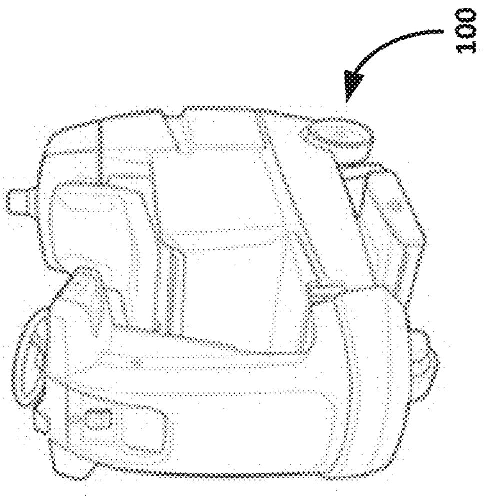

FIGS. 1A, 1, and 1C illustrate embodiments of a surface maintenance machine. FIG. 1A illustrates an upright system 102 having a vertically upright handle that can articulate relative to scrubber assembly for operator ergonomic convenience. FIG. 1B illustrates a walk behind system 104, which includes a platform that an operator stands on along with controls to steer the system. FIG. 1C illustrates a ride-on platform 100 that includes a seat and controls for an operator to drive the system. Alternative floor maintenance driving platforms can be used with a scrubber assembly according to the disclosure, such as a chariot or stand-on rider, as will be appreciated by those of ordinary skill in the art.

Figure 2:
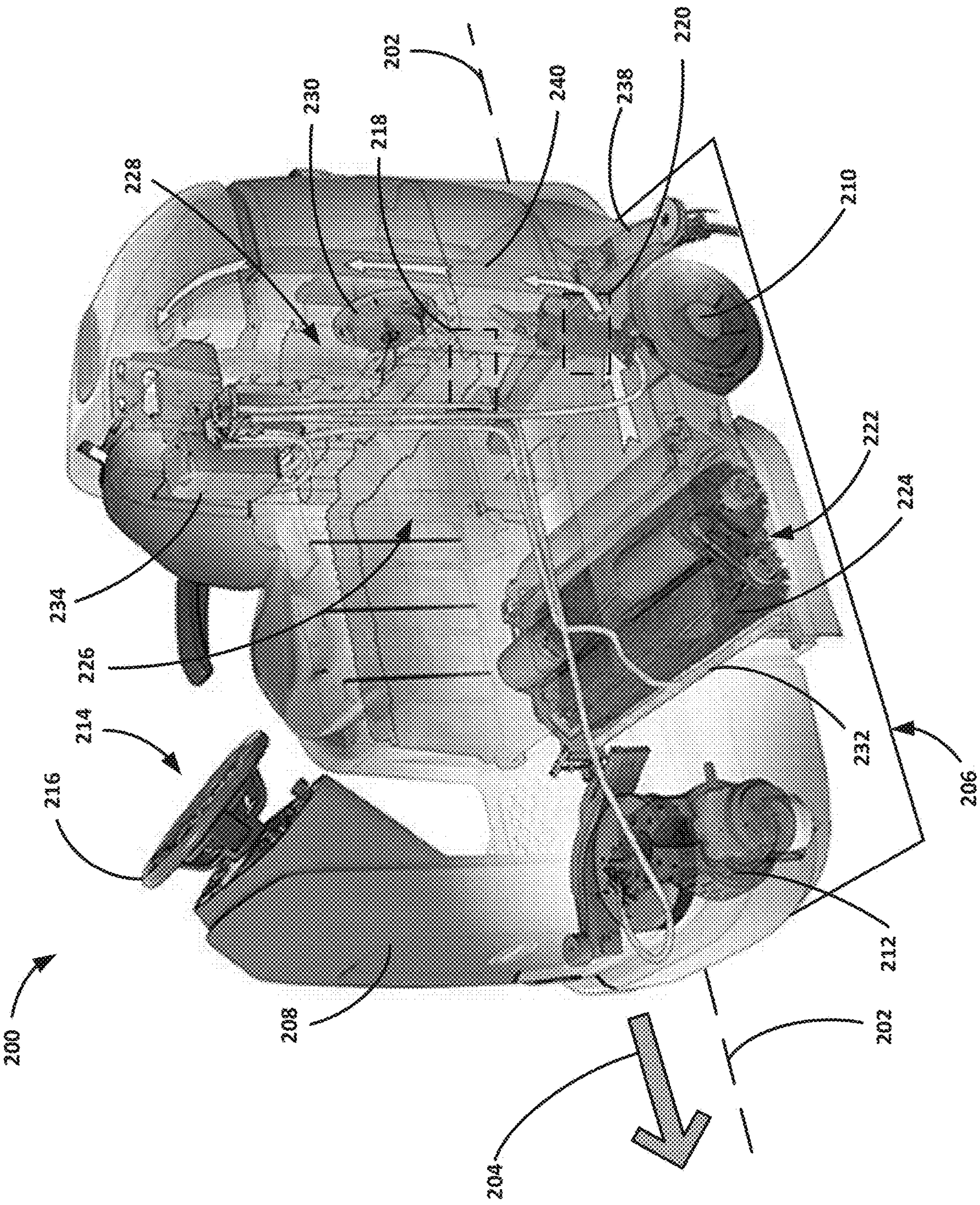
FIG. 2 is a perspective view of an example floor surface maintenance machine showing an example configuration of a fluid delivery/recovery system according to the disclosure.

FIG. 2 is a perspective view of an example floor surface maintenance machine 200 showing an example configuration of a fluid delivery/recovery system according to the disclosure. The surface maintenance 200 machine can perform maintenance tasks such as sweeping, scrubbing, and/or polishing (burnishing) a surface 206. The surface 206 can be a floor surface, pavement, road surface and the like. Embodiments of the surface maintenance machine 200 include components that are supported on a body 208. The body 208 comprises a frame supported on wheels 210, 212 for travel over the surface 206 on which a surface maintenance operation is to be performed. The body 208 may be defined as having a longitudinal centerline 204 extending through the surface maintenance machine 200. The example of FIG. 2 includes one forward wheel 212 and two rearward wheels 210, with forward being defined as the forward direction of travel 202. Other examples can include various other wheel arrangements. The body 208 can include operator controls 214 and a steering control, such as a steering wheel 216, to control the speed of the surface maintenance machine 200 without having to remove the operator's hands from the steering wheel 216 using means known in the art. Controls 214 for steering, propelling, and controlling various operations of the surface maintenance machine 200 can be provided on an operator console.

The surface maintenance machine 200 can be powered by one or more batteries 218. The batteries 218 can be proximate the rear of the surface maintenance machine 200, or can instead be located elsewhere such as within the interior of the surface maintenance machine 200, supported within a frame, and/or proximate the front of the surface maintenance machine. Alternatively, the surface maintenance machine can be powered by an external electrical source (e.g., a power generator) via an electrical outlet or a fuel cell.

The surface maintenance machine 200 can include one or electric motors 220 that are supported on the body 208 and can be located within the interior of the surface maintenance machine. The one or more electric motors 220 can receive power from the one or more batteries 218. Electric motors 220 supply torque to the surface maintenance machine 200, including the torque to rotate one or more of the wheels 210, 212 in order to propel the surface maintenance machine 200 in a selected direction.

The surface maintenance machine 200 can include a surface maintenance head assembly 222 (sometimes referred to as a maintenance head assembly or maintenance head). The maintenance head assembly 222 supports one or more surface maintenance tools 224 such as scrub brushes, sweeping brushes, and polishing, stripping or burnishing pads, and tools for extracting (e.g., dry or wet vacuum tools). In some examples, the maintenance head assembly 222 can be a cleaning head comprising one or more cleaning tools (e.g., sweeping or scrubbing brushes) as surface maintenance tools. In other examples, the maintenance head assembly 222 is a treatment head comprising one or more treatment tools (e.g., polishing, stripping or buffing pads) as surface maintenance tools.

Many different types of surface maintenance tools can be included to perform one or more maintenance operations on the surface 206. The maintenance operation can be a dry operation or a wet operation. In a wet operation, fluid, such as cleaning fluid from an on-board fluid (e.g., solution) tank 226, is supplied to, or proximate to, the maintenance head 222 where it can be sprayed onto the one or more surface maintenance tools 224, as is described later in this disclosure, or onto an underlying floor surface 206. Such maintenance tools include sweeping brushes, scrubbing brushes, wet scrubbing pads, polishing/burnishing and/or buffing pads. In some examples, one or more side brushes for performing sweeping, dry or wet vacuuming, extracting, scrubbing or other operations can be provided. The maintenance head assembly 222 can extend toward the surface 206 on which a maintenance operation is to be performed. For example, the maintenance head assembly 222 can be attached to the base of the surface maintenance machine 200 such that the head can be lowered to an operating position and raised to a traveling position. The maintenance head assembly 222 can be connected to the surface maintenance machine 200 using any known mechanism, such as a suspension and lift mechanism. The torque for the maintenance head can be provided by the one or more electric motors 220. In some examples, different ones of the one or more electric motors provide the torque to propel the machine and provide the torque to actuate components of the maintenance head assembly 222, such as the one or more surface maintenance tools 224.

Continuing with the example of FIG. 2, floor maintenance machine 200 includes a cleaning fluid reservoir 226, a waste fluid reservoir 228, a vacuum 230, a pump 234, and the surface maintenance head assembly 222. Cleaning fluid held within cleaning fluid reservoir 226 can be dispensed through a fluid line 232 extending from the cleaning fluid reservoir 226 to a pump 234 and to the surface maintenance head assembly 222. In some examples, the cleaning fluid source includes one or more of a cleaning fluid supply, such as a cleaning fluid reservoir 226 carried by the floor maintenance machine 200, one or more pumps 234, a variable valve, and fluid supply lines 232. A person having ordinary skill in the art will appreciate that cleaning fluid sources in addition to and other than a reservoir are contemplated.

In some examples, the pump 234 can be one or more pumps that are separately controlled and in communication with separate outlet nozzles. In some examples, the pump 234 can be in fluid connection with both the cleaning fluid reservoir 226 and one or more outlet nozzles located on the surface maintenance head assembly 222. The pump 234 can be an electric diaphragm pump, but other types of pumps can be used. The pump 234 can be configured to pump cleaning solution from the cleaning fluid reservoir 226, through a fluid connection 232, to the one or more outlet nozzles. The pump 234 can be controlled through varying electrical power delivered to the pump, for example, increasing or decreasing the voltage applied to the pump. Increasing or decreasing the power delivered to pump 234, can change an amount of fluid pumped by pump 234, a pressure of the fluid exiting the one or more outlet nozzles, an intensity (e.g., velocity or proportional thereto) of the fluid exiting the outlet nozzles, and/or other properties of pumped fluids. In some examples, the pump 234 can be fluidly connected to a variable valve that can control properties of fluid passing therethrough (e.g., cleaning fluid), such as pressure, flow rate, velocity, and/or intensity of the fluid.

In the example of FIG. 2, cleaning fluid can be dispensed on one or more brushes within the surface maintenance head assembly and/or directly on the floor surface 206 to be cleaned. Dirty fluid having passed over the surface 206 to be cleaned can be extracted off the surface via a vacuum squeegee 236 in fluid communication with vacuum 230. Vacuum 230, which can be implemented as a vacuum motor or vacuum pump, can generate a vacuum force effective to draw liquid and/or solids contained on the surfaces into waste fluid reservoir 228. Accordingly, a waste fluid line/vacuum line 240 can extend from vacuum squeegee 238 to waste fluid reservoir 228.

In some examples, floor maintenance machine 200 can be configured without any floor facing or floor contacting liquid collection elements, such as a squeegee and/or vacuum collection system. Rather, residual liquid retained within a brush can be withdrawn directly from the brush within surface maintenance head assembly 222 using a different vacuum squeegee. This arrangement can be useful to minimize the footprint of floor maintenance machine 200, enhancing the mobility of the device and the ability of the device to access tight spaces, such as under and around merchandise display shelves in convenience stores. That being said, in some examples, floor maintenance machine 200 can include a floor facing liquid removal system in addition to the floor surface liquid removal system.

Figure 3:
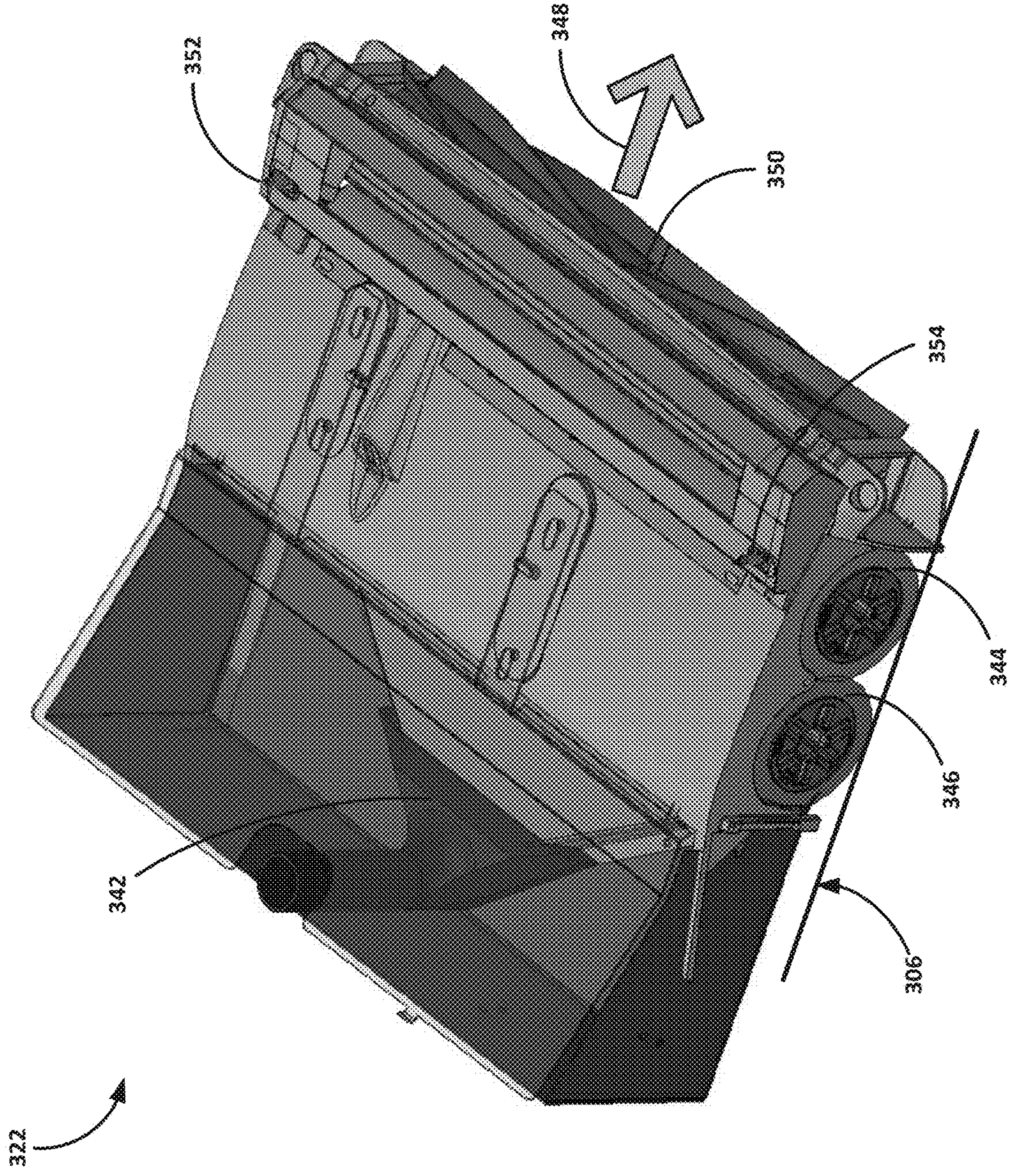
FIG. 3 is a perspective view of an example surface maintenance head assembly with a vacuum squeegee.

FIG. 3 is a perspective view of an example surface maintenance head assembly 322 with a vacuum squeegee 342 facing second brush 346. Second brush 346 is positioned rearwardly of a first brush 344 relative to a direction of forward movement 348 of surface maintenance head assembly 322. During operation, first brush 344 and second brush 346 can rotate in counter rotational directions about their respective axes during operation of surface maintenance head assembly 322. Other brush rotation configurations are possible, and it should be appreciated that the disclosure is not limited in this respect. In any configuration, first brush 344 and second brush 346 can scour the floor surface 306 being cleaned.

In some examples, surface maintenance head assembly 322 includes at least two rotational brushes 346, 344 to scrub the floor surface 306, although it can include additional rotational brushes. In the example of FIG. 3, surface maintenance head assembly 322 includes a third brush 350 positioned forwardly of first brush 344 and second brush 346 with respect to the forward direction of travel 348. Third brush 350 can be configured to rotate about a third rotational axis independently of first brush 344 and second brush 346. Third brush 350 can function to knockdown dust and/or debris, causing the floor contaminants to be drawn into the surface maintenance head assembly 322 rather than blown forward out of the path of the assembly during movement.

Surface maintenance head assembly 322 can be operated in a wet scrubbing mode wherein cleaning fluid is dispensed to, or toward, the assembly. In some examples, the cleaning fluid can be dispensed during rotation of the brushes 344, 346, 350 and/or when the brushes are stationary. To facilitate distribution of cleaning fluid, the surface maintenance head assembly 322 of FIG. 3 includes outlet nozzles 352, 354 in fluid communication with a cleaning fluid reservoir (e.g., 228 of FIG. 2) via a cleaning fluid line (e.g., 232 of FIG. 2). In some examples, each of the one or more outlet nozzles 352, 354 has a diameter of greater than 0.030 inches. In some examples, each outlet nozzle has a diameter equal to about 0.070 inches.

In the example of FIG. 3, outlet nozzles 352, 354 are be positioned to dispense cleaning fluid on first brush 344, on second brush 346, and/or directly on the floor surface 306. In the configuration of FIG. 3, the outlet nozzles 352, 354 are positioned to dispense cleaning fluid on a leading side of first brush 344. Dispensing cleaning fluid on first brush 344, wets the brush such that the floor surface 206 being cleaned is moistened via the brush, rather than direct application of cleaning fluid.

In some examples, the one or more outlet nozzles 352, 354 are positioned to wet first brush 344 such that rotation of first brush 344 transfers cleaning fluid to the floor surface 306 and to second brush 346, which can also absorb some of the cleaning fluid from the floor surface 306. Thus, second brush 346 can also be wetted during operation of maintenance head assembly 322 even if cleaning fluid is not dispensed directly on second brush 344. However, in some examples, the one or more outlet nozzles 352, 354 can be positioned to dispense cleaning fluid on the second brush 346 in addition to or in lieu of dispensing cleaning fluid on the first brush 344.

Figure 4:
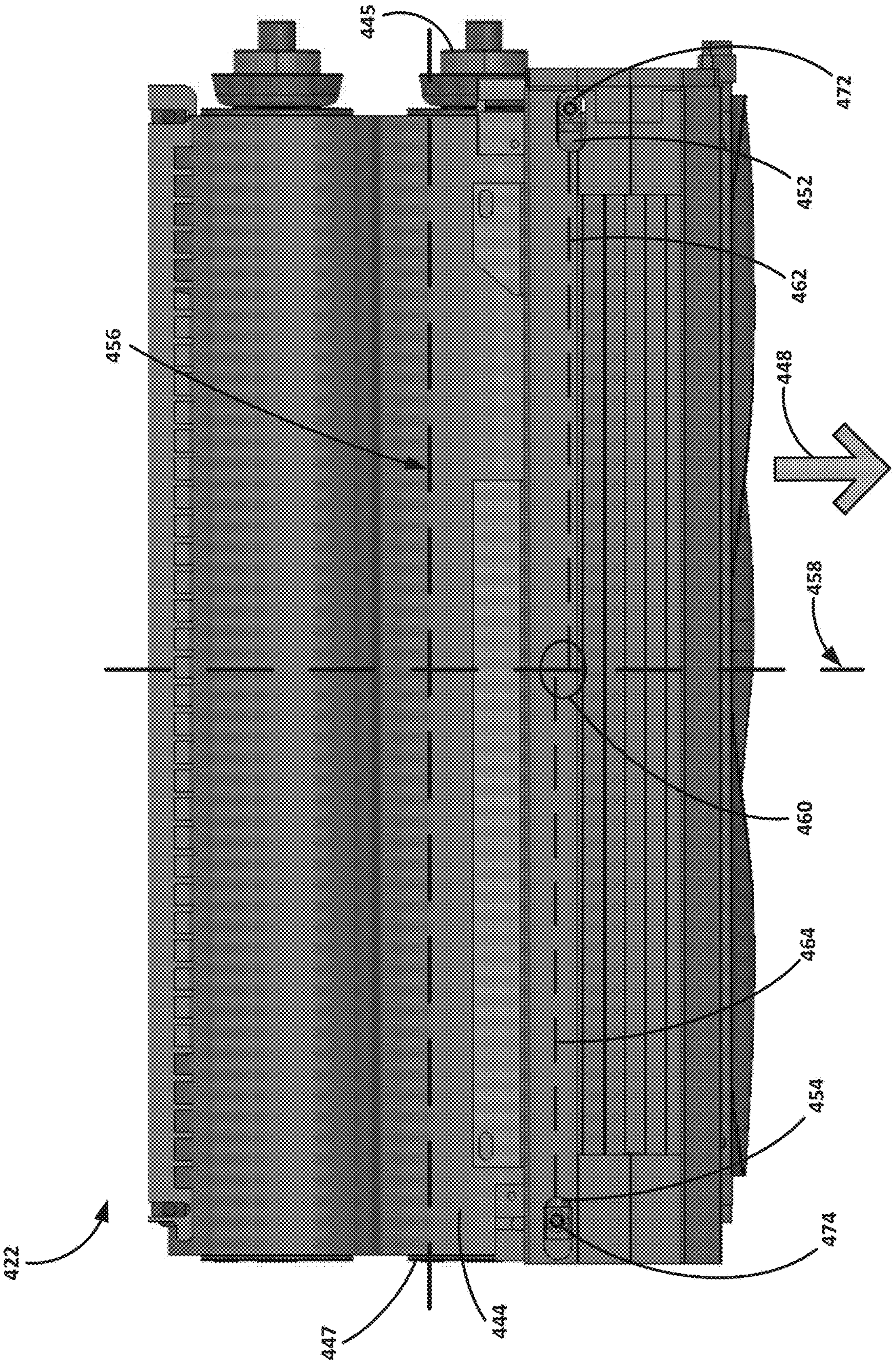
FIG. 4 is top-down view of an example surface maintenance head assembly without a top surface and without a vacuum squeegee.

FIG. 4 is top-down view of an example surface maintenance head assembly 422 without a top surface and without a vacuum squeegee. Brush 444 extends parallel to lateral centerline 456 of the surface maintenance head assembly 422 and terminates in a first end 445 and a second end 447. Lateral centerline 456 is perpendicular to longitudinal centerline 458 of the surface maintenance head assembly. The second end 447 of brush 444 is located opposite the first end 445 along the lateral centerline 456. Outlet nozzles 452 and 454 can be located proximate the first end 445 and the second end 447 of the brush respectively. In the example of FIG. 4, outlet nozzles 452 and 454 are positioned distally from a longitudinal centerline 458 of the surface maintenance head assembly 422 and are directed toward the longitudinal centerline 458. Outlet nozzle 452 is directed toward the second end 447 of brush 444 and outlet nozzle 454, located on the opposite side of longitudinal centerline 458, is directed toward the first end 445 of brush 444. Thus, each outlet nozzle is directed toward an end of the brush opposite from the end of the brush to which the outlet nozzle is proximately mounted. Positioning the outlet nozzles 452, 454 in this manner allows the dispensing of cleaning liquid across a majority of the brush 444.

In the example of FIG. 4, outlet nozzles 452, 454 are not collinear in the horizontal plane as shown by 460. In some examples, configuring the outlet nozzles 452, 454 in this way reduces the amount of liquid dispensed by one outlet nozzle that contacts the liquid dispensed by the other outlet nozzle if liquid is dispensed simultaneously from each outlet nozzle. This prevents the fluid from colliding as when the fluid collides, it can unevenly coat the brush (e.g. too much fluid in the center of the brush and not enough along the ends of the brush). Thus, when compared to a configuration of outlet nozzles that are collinear in the horizontal plane, the configuration of FIG. 4 reduces the amount of cleaning fluid that collides after being dispensed by the outlet nozzles, resulting in a more even coating of the brush and a possible reduction in fluid required. For example, with respect to FIG. 4, outlet nozzle 452 can dispense fluid in a first horizontal plane 462 and outlet nozzle 454 can dispense fluid in a second horizontal plane 464, the first horizontal plane 462 being parallel to and not intersecting the second plane 464. This allows the outlet nozzles 452, 454 to dispense fluid at substantially the same time with most of the fluid contacting only the brush 444 after leaving the outlet nozzles. In the example of FIG. 4, either one of the outlet nozzles 452, 454 can be located forward or rearward of the other nozzle as defined by the forward direction of travel 448. Although two outlet nozzles are shown in FIG. 4, one skilled in the art will appreciate that one or more outlet nozzles could be used.

In the example of FIG. 4, fluid line connectors 472, 474, which can be quick connect connectors, are each fluidly coupled to their respective outlet nozzles 452, 454. The fluid line connectors 472, 474 allow one or more fluid lines (e.g. cleaning fluid line 232 in FIG. 2) to be attached by pushing the end of the fluid lines onto the fluid line connectors 472, 474. Attaching the fluid lines in this manner can be easier than other methods, such as tightening a metal band across the end of the tubing, as it does not require tools and can be undone by simply pulling the fluid lines off the fluid line connectors. With the fluid lines connected to the fluid line connecters, fluid can be dispensed from a fluid reservoir, to a pump, through the fluid lines, through the fluid line connectors 472, 474, and finally out of the outlet nozzles 452, 454. A person having ordinary skill in the art will recognize that other methods of attaching fluid lines to the outlet nozzles can be used.

Figure 5:
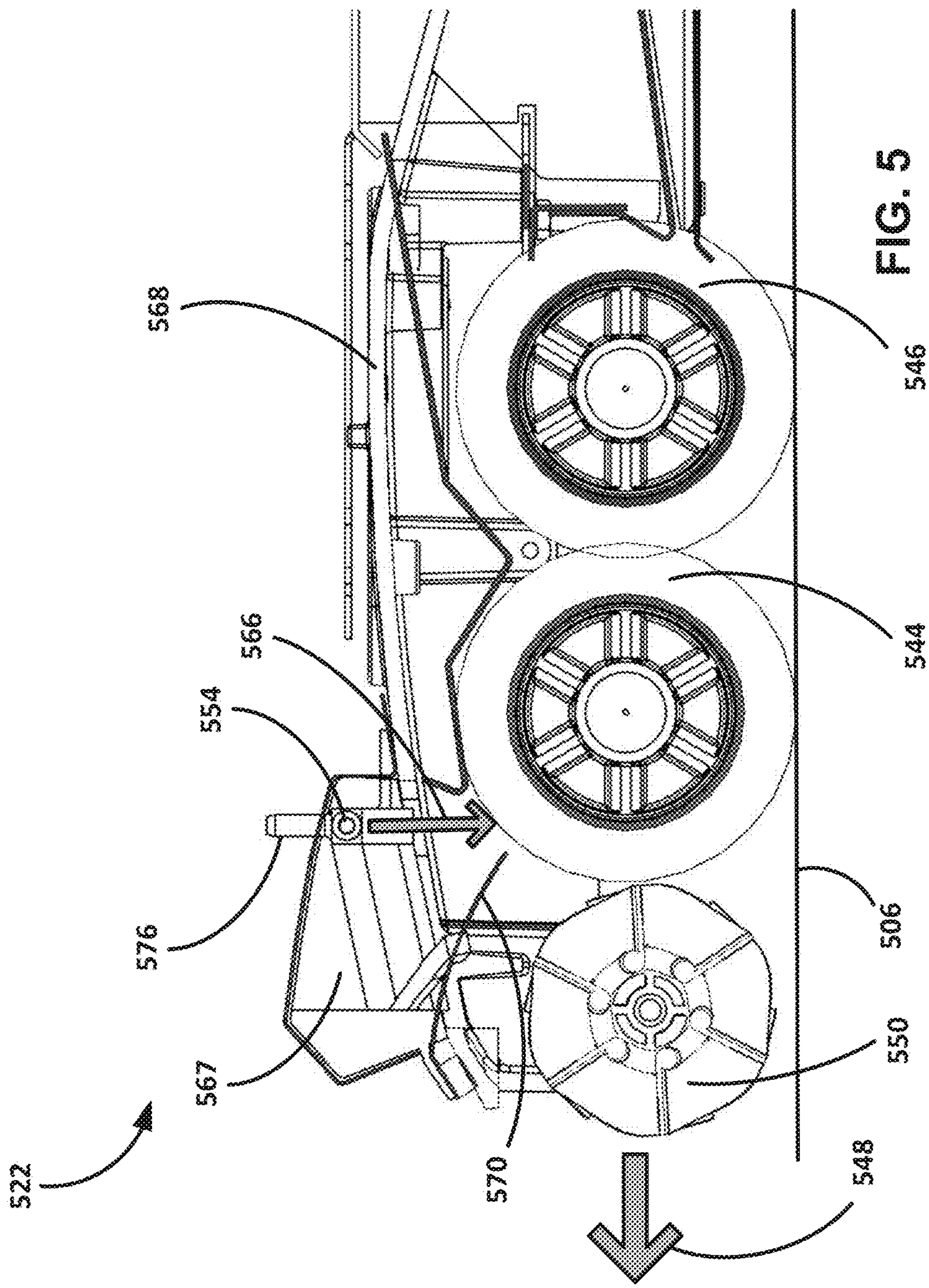
FIG. 5 is a cross-sectional view of the example surface maintenance head assembly of FIG. 3 illustrating an example nozzle dispensing cleaning fluid on a brush.

FIG. 5 is a cross-sectional view of the example surface maintenance head assembly of FIG. 3 illustrating an example outlet nozzle 554 dispensing cleaning fluid on a first brush 544. Outlet nozzle 554 is located between first brush 544 and a third brush 550, with the third brush 550 being located forward of the first brush 544 relative to the forward direction of travel 548. In this configuration, the outlet nozzle 554 can dispense fluid directly on the first brush 544 from above as depicted by arrow 566. The fluid, after being dispensed from the outlet nozzle 554 above the first brush 544, can fall onto the first brush 544 after traveling some vertical and some lateral distance.

In the example of FIG. 5, the components of the surface maintenance head assembly 522 are contained within a housing 568. Housing 568 can have a variety of different sizes and shapes depending on the configuration of brushes within the maintenance head assembly 522. Housing 568 can include an upright wall 567 which can stop fluid from being dispensed past the brush 544. In the illustrated example, the housing 568 does not enclose all of the surface maintenance head assembly 522, but substantially encloses many components of the surface maintenance head assembly 522 including the first brush 544, a second brush 546, and the outlet nozzle 554. In some examples, housing 568 can also enclose the third brush, or alternatively, the third brush can be positioned forward of housing 568. In FIG. 5, third brush 550 is positioned outside of housing 568 such that the housing does not enclose the brush.

When configured as in FIG. 5, the housing 568 can include a front wall 570 that extends downward toward floor surface 506. In some configurations, front wall 570, or a portion thereof, is angled rearward in a region between first brush 544 and third brush 550. This rearward projection of front wall 570 can help isolate first brush 544, which is inside of housing 568, from third brush 550, which is outside of the housing. This isolation can prevent airflow generated by the rotation of the first brush 544 from pushing debris out of the cleaning path of the head assembly 522. The rearward projection of front wall 570 can also help prevent cleaning fluid dispensed through outlet nozzle 554 from discharging directly on third brush 550. This can be desirable as third brush 550 can be a different type of brush than either first brush 544 or second brush 546, for example, a brush which is not as effective at cleaning when it is wet.

Continuing with FIG. 5, outlet nozzle 554 can be in fluid communication with a cleaning fluid reservoir (e.g. 226 of FIG. 2) via a fluid line connector 576. In some examples, fluid line connector 576 can accept many different fluid connections such as tubs and hoses which can fit over fluid line connector 576 and create a seal from which fluid cannot easily penetrate. This can be advantages as a user can quickly disconnect one cleaning solution reservoir and connect a different cleaning solution reservoir by pulling off and putting on a different tube on the fluid connector. It can also be advantages for maintenance as the outlet nozzles could be more easily cleaned when not attached to a fluid line. The outlet nozzle 554 of FIG. 5 can thus be fluidly connected to the cleaning fluid reservoir (e.g. 226 of FIG. 2).

Figure 6:
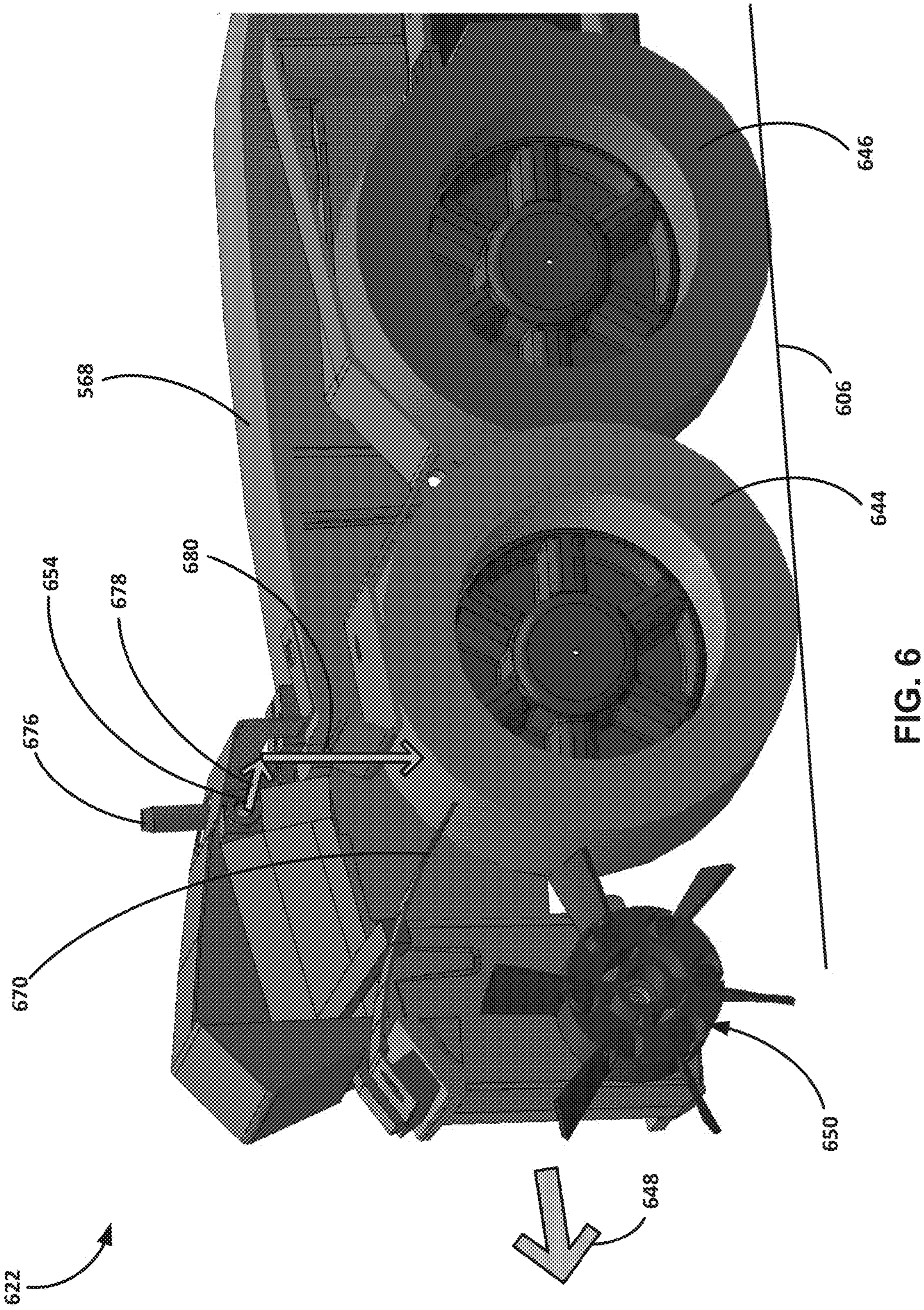
FIG. 6 is a perspective, cross-sectional view of an example surface maintenance head assembly, similar to that of FIG. 5, illustrating an example nozzle dispensing cleaning fluid on a brush.

FIG. 6 is a perspective, cross-sectional view of an example surface maintenance head assembly 622 illustrating an outlet nozzle 654 dispensing cleaning fluid on a brush 644. The surface maintenance head assembly 622 includes first brush 644, second brush 646, third brush 650, outlet nozzle 654, housing 668, front wall 670, and can move in forward direction of travel 648. Outlet nozzle 654 is located above first brush 644 and can allow fluid exiting the outlet nozzle 654 to travel some horizontal distance before hitting the scrubber brush 644, thereby reaching a longer extent of the scrubber brush compared fluid expelled without any horizontal trajectory. Fluid dispensed by outlet nozzle 654 can initially travel some horizontal distance away from the outlet nozzle 654 as shown by arrow 678. Subsequently, fluid dispensed by outlet nozzle 654 can travel some distance vertically downward toward surface 606 as shown by arrow 680. The arrows are only a simplified example showing horizontal and vertical components of the fluid travel, as fluid can generally travel in a parabolic curve (e.g. having both a horizontal distance and a vertical distance) after exiting outlet nozzle 654.

Figure 7:
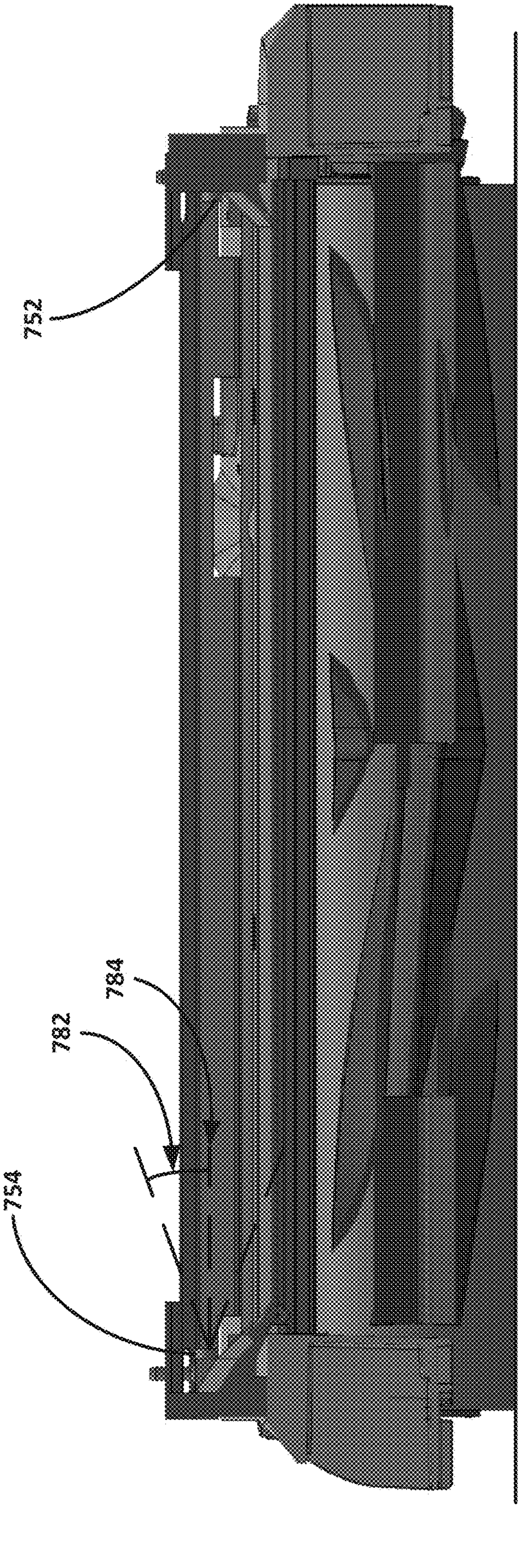
FIG. 7 is a front view of an example surface maintenance head assembly illustrating angles at which an outlet nozzle can be directed.

FIG. 7 is a front view of an example surface maintenance head assembly 722 illustrating angles at which outlet nozzles can be directed. Outlet nozzles 752, 754 can be directed at an angle above or below a horizontal plane. For example, outlet nozzle 754 can be directed at an angle 782 above horizontal plane 784. In some examples, the angle 782 of the outlet nozzle is slightly positive relative to the horizontal. In some particular examples, angle 782 is five degrees above horizontal plane 784. By using a positive angle, fluid exiting the outlet nozzles 752, 754 can travel a further horizontal distance when compared to using an angle that is negative relative to the horizontal (e.g. five degrees below the horizontal plane 784). By traveling a further horizontal distance, the fluid exiting the outlet nozzles 752, 754 can wet a longer length of a brush.

Figure 8:
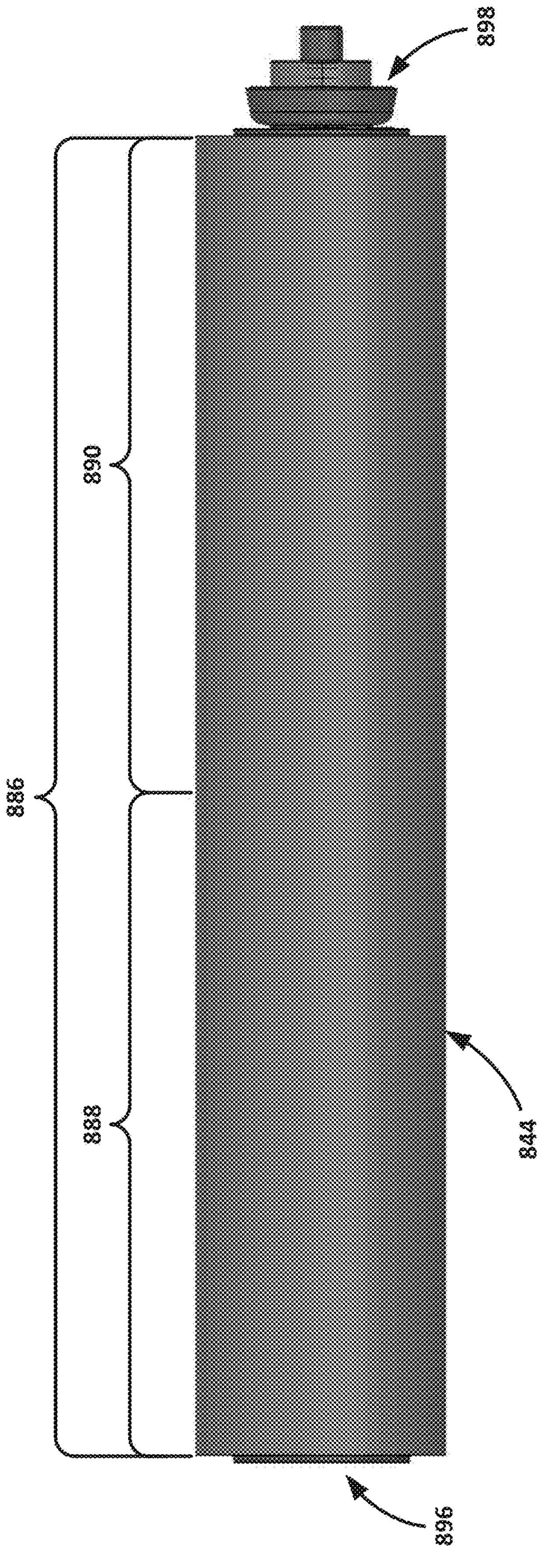
FIG. 8 is a top-down view of an example brush illustrating a possible splitting of the brush into different sections.

FIG. 8 is a top-down view of an example brush 844 illustrating one possible division of the brush into different sections. Brush 844 is divided into areas by length. Brush 844 spans entire length 886 and is divided into equal length sections 888, 890. In some examples the brush is divided into more sections, or fewer sections, and each section can be the same length or different lengths. Through controlling an intensity of fluid exiting an outlet nozzle, as previously discussed herein, the fluid can be controlled to land primarily on one of the areas of the brush 844. For example, a first intensity of fluid exiting the outlet nozzle on a first side 896 of brush 844 corresponds to the fluid wetting a first area 888 of brush 844. After a length of time dispensing fluid at a first intensity to wet the first area 888 of the brush, a second intensity of fluid exiting the outlet nozzle on the first side 896 of brush 844 corresponds to the fluid wetting a second area 890 of brush 844. In some examples, changing from the first intensity of fluid exiting the outlet nozzle to the second intensity of fluid exiting the outlet nozzle includes varying the intensity through a range of intensities between the first intensity and the second intensity. The range of intensities can generally correspond to a range of areas of the brush 844.

In some examples, the first intensity of fluid exiting the outlet nozzle proximate the first side 896 of brush 844 corresponds to wetting a first area 888 of the brush. The first area 888 being closer to the first side 896 of brush 844, and thus closer to the outlet nozzle, than a second area 890 of the brush. After a length of time, the fluid exiting the outlet nozzle changes to a second intensity, greater than the first intensity, wetting the second area 890 of the brush 844. In other examples, the first intensity of fluid exiting the outlet nozzle proximate the first side 896 of brush 844 corresponds to wetting a second area 890 of the brush. The second area 890 being closer to a second side 898 of brush 844 and thus further from the outlet nozzle than a first area 888 of the brush.

The process of varying the intensity of the fluid exiting the outlet nozzle between two or more intensities can be done in a cyclical manner, such as alternating back and forth between first and second intensities. For example, a cycle can include: changing the energy delivered to the pump using a change in voltage, thereby changing the intensity of the fluid exiting outlet nozzles, thereby changing the length of the brush that is wetted, and subsequently wetting the brush sufficiently. In some examples, additional intensities or off states can be included. In some examples, a pump can dispense fluid at a first intensity, then a second intensity different from the first, then completely suspend from dispensing fluid, then later resume dispensing at the first intensity. In some examples, the pump can dispense fluid in a range of intensities between the first intensity and the second intensity. Other methods of modulating the intensity of the dispensing (e.g., spraying) of the fluid are also contemplated, including modulating the area of the outlet orifice such as with a variable valve.

In some embodiments, the length of time associated with each cycle can be varied. For example, the length of time the fluid is dispensing can be shorter than a length of time that the fluid is suspended from dispensing. In some examples, the time spent dispensing fluid at the first or second intensities and the time spent dispensing fluid at intensities different than the first or second intensities, can be varied. For example, the time spent at intensities which wet a second length of the brush can be longer than the time spent at intensities which wet a first length of the brush.

In some cases, a process for wetting a brush (e.g., a cyclic process for wetting a plurality of areas of a brush) is automatically started after a predetermined time period of machine operation. In other cases, the process is started via manual control using the controls. In some embodiments, a machine can be capable of both automated and manual initiation of such processes. In other examples, only automatic or only manual initiation is possible.

In some examples, fluid is applied to an area for a sufficient amount of time to wet substantially the entire surface of the roller within a distance range of the nozzle. For example, in some cases, the brush is rotating at a rate such that it takes a certain length of time to complete one revolution. In some embodiments, the pump is configured to apply fluid to a particular area for at least as long as it takes for the brush to complete one revolution. In some such examples, the pump applies fluid to an area for enough time for the brush to complete a plurality of revolutions.

Figure 9A:
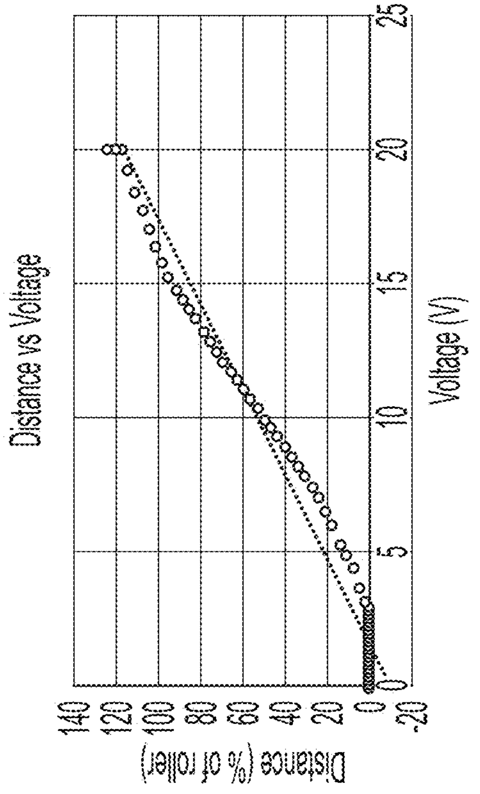
FIGS. 9A-9C are graphical representations of data which illustrate different properties associated with various examples of a cleaning solution dispensing system.
Figure 9B:
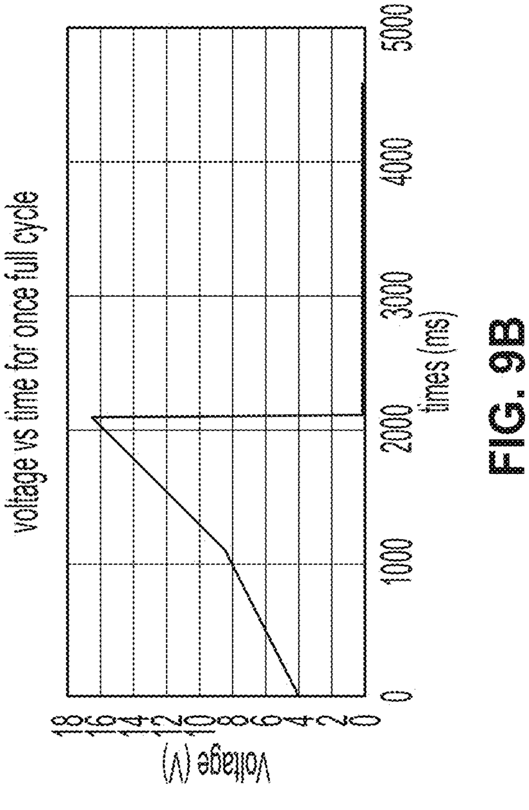
Figure 9C:
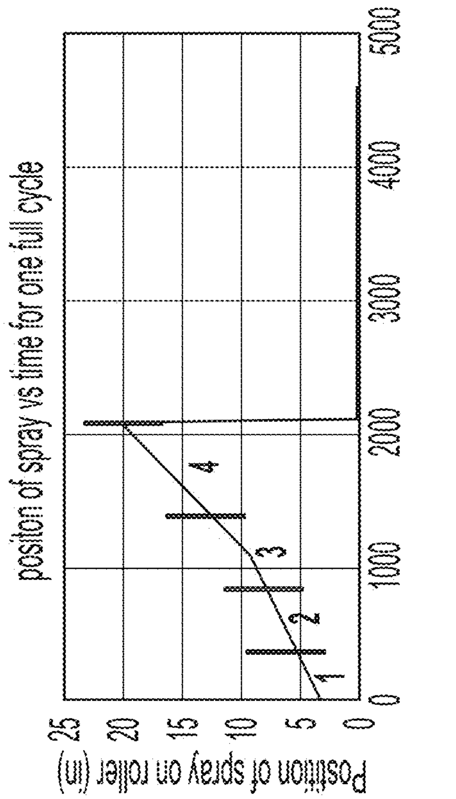

FIGS. 9A-9C are graphical representations of data which illustrate different properties associated with various examples of a cleaning solution dispensing system. As discussed previously in this disclosure, in some examples, a surface maintenance machine can include a pump which can vary the intensity of fluid exiting outlet nozzles by increasing or decreasing the voltage of the pump. As shown in FIG. 9A, varying the voltage of the pump, and thus varying the intensity of dispensing fluid onto a brush, can control the overall horizontal distance fluid travels before contacting the brush. FIG. 9A shows the distance fluid travels as a percentage of the brush length for a series of pump voltages. Percentages over 100%, in practice, represent the fluid reaching the edge of the brush (e.g., contacting a housing enclosing the brush). Although most of the fluid is dispensed at a distance determined by the intensity of the fluid leaving the outlet nozzles, it should be recognized that some fluid may fall short or go beyond the determined distance. For instance, depending on the width or pattern of the fluid as it is dispensed, the amount of fluid reaching a particular distance could vary. If the liquid is dispensed in a narrow jet pattern, the liquid is more likely to fall in a smaller area on the brush, according to FIG. 9A. If, instead, the liquid is dispensed in a slightly wider pattern, such as a spray pattern, the liquid is more likely to fall in a wider or longer area on the brush, but generally still according to FIG. 9A.

The example of FIG. 9B shows that voltage over time can be increased until a predetermined point (e.g. brush is sufficiently wetted) at which voltage is no longer applied to the pump, effectively turning it off for a period of time. This process can be followed repeatedly in a cyclical nature as a surface maintenance machine cleans a surface.

The example of FIG. 9C shows that the position of fluid on the roller as it is sprayed from an outlet nozzle can increase over time as the intensity of fluid exiting the outlet nozzle increases due to increased voltage applied to the pump. In the example of FIG. 9C, the roller is divided into discrete sections in order to properly achieve desired flow rate and roller wetness among other desired properties. In this case, the roller is divided into four sections of equal length and the graph shows when each section is being wetted as a function of time. The process of wetting the sections can be stopped for a time when the brush is sufficiently wetted, as indicated by the position of the spray dropping to 0 inches, and then started again in a cyclical manner repeatedly following the process shown in FIG. 9C as a surface maintenance machine cleans a surface.

The cleaning fluid source can be configured to vary the intensity and/or flow of the fluid being dispensed from each outlet nozzle simultaneously or independently. In one embodiment, cleaning fluid source is configured to simultaneously dispense the fluid from two outlet nozzles at the same level of intensity. In another example, the cleaning fluid source is configured such that the fluid intensity of different nozzles is different. In one such example, the intensities of the different nozzles are modulated separately but in a coordinated manner such that liquid dispensed by one outlet nozzle is less likely to contact or collide with the liquid dispensed by another outlet nozzle. In certain designs, when the fluid from different nozzles collides, it can unevenly coat the brush (e.g. too much fluid in the center of the brush and not enough along the ends of the brush). Such coordination of the nozzle dispensation may take the form of varying the relative timing and/or varying the intensity of the dispensation of the liquid from different nozzles. One nozzle may have a higher intensity (e.g., where liquid dispensed travels further along the length of the respective brush) while another nozzle, located at the opposite end of such brush, may have a lower intensity (e.g., where liquid dispensed travels nearer to the nozzle along the length of the same brush). In such coordinated manner, liquid dispensed at the lower intensity outlet nozzle is less likely to travel far enough to collide with the liquid dispensed at the higher intensity outlet nozzle. Similarly, when such nozzles are located at or towards opposite ends of a brush, the pump may cause liquid to not dispense from one nozzle while the liquid is dispensing from the second nozzle or while the liquid is dispensing from the second nozzle at a higher intensity. In such coordinated manner, liquid dispensed from one outlet nozzle is less likely to collide with the liquid dispensed from another outlet nozzle.

Various examples have been described. These and other examples are within the scope of the following numbered embodiments.

The invention claimed is:

1. A surface maintenance machine that uses a cleaning fluid on a surface, comprising:

a body;

wheels supporting the body for movement over the surface;

a maintenance head assembly supported by the body and extending toward the surface and comprising a tool for performing a surface maintenance operation using the cleaning fluid;

an outlet nozzle configured to dispense the cleaning fluid from the outlet nozzle onto the tool;

a cleaning fluid source carried by the body and fluidly connected to the outlet nozzle to supply the cleaning fluid to the outlet nozzle;

a pump fluidly connected to the cleaning fluid source and configured to pump the cleaning fluid from the cleaning fluid source to the outlet nozzle; and a controller configured to apply power to the pump in a controlled manner of predetermined repeating cycles of voltages, the applied power to the pump causing the pump to pump the cleaning fluid out from the outlet nozzle and onto the tool, wherein each predetermined repeating cycle of voltages includes a first phase and a second phase that is subsequent to the first phase, the first phase including:
(i) a first voltage applied to the pump at a first time to pump the cleaning fluid out from the outlet nozzle at a first velocity onto a first area of the tool; and
(ii) a second voltage applied to the pump at a second time to pump the cleaning fluid out from the outlet nozzle at a second velocity onto a second, different area of the tool, wherein the second voltage is greater than the first voltage and the second time is subsequent to the first time;
the second phase including one or more voltages less than each of the first voltage of the first phase and the second voltage of the first phase.

2. The surface maintenance machine of claim 1, wherein the body has a longitudinal centerline, the outlet nozzle being located distal from the longitudinal centerline and located relative to the tool such that the cleaning fluid dispensed by the outlet nozzle is directed toward the longitudinal centerline in order to be dispensed onto the tool.

3. The surface maintenance machine of claim 2, wherein the tool has a lateral centerline perpendicular to the longitudinal centerline, the tool extending parallel the lateral centerline and terminating in a first end and a second end, the second end being opposite the first end along the lateral centerline, the outlet nozzle being located proximate to the first end and oriented such that the cleaning fluid dispensed by the outlet nozzle is directed toward the second end.

4. The surface maintenance machine of claim 3, further comprising a second outlet nozzle configured to dispense the cleaning fluid from the second outlet nozzle onto the tool, the second outlet nozzle being offset from the outlet nozzle relative to an outlet nozzle lateral centerline, the outlet nozzle lateral centerline extending from the outlet nozzle parallel to the lateral centerline of the tool.

5. The surface maintenance machine of claim 4, wherein the outlet nozzle, the second outlet nozzle, and connections to the cleaning fluid source are such that variance of velocity of the cleaning fluid dispensed by the outlet nozzle occurs simultaneously with and equally to variance of velocity of the cleaning fluid dispensed by the second outlet nozzle.

6. The surface maintenance machine of claim 4, wherein the outlet nozzle is A located forward of the second outlet nozzle, wherein forward is defined in a direction of travel of the surface maintenance machine.

7. The surface maintenance machine of claim 3, wherein the first area of the tool is closer to the first end than the second end, the second area of the tool closer to the second end than the first end, the first velocity being less than the second velocity.

8. A surface maintenance machine comprising:
a body;
wheels supporting the body for movement over a surface;
a maintenance head assembly supported by the body and extending toward the surface and comprising a tool for performing a surface maintenance operation using a cleaning fluid;
a cleaning fluid source carried by the body and fluidly connected to an outlet nozzle to supply the cleaning fluid to the outlet nozzle, the outlet nozzle configured to dispense the cleaning fluid onto the tool of the maintenance head assembly;
a pump fluidly connected to the cleaning fluid source and configured to pump the cleaning fluid from the cleaning fluid source to the outlet nozzle; and
a controller configured to apply power to the pump in a controlled manner, the controlled manner including applying a predetermined repeating cycle of voltages to the pump to cause the pump to pump the cleaning fluid out from the outlet nozzle and onto the tool, wherein the predetermined repeating cycle of voltages includes a first phase and a second phase that is subsequent to the first phase, the first phase including:
(i) a first voltage applied to the pump at a first time to pump the cleaning fluid out from the outlet nozzle at a first velocity onto a first area of the tool; and
(ii) a second voltage applied to the pump at a second time to pump the cleaning fluid out from the outlet nozzle at a second velocity onto a second, different area of the tool, wherein the second voltage is greater than the first voltage and the second time is subsequent to the first time;
the second phase including one or more voltages less than each of the first voltage of the first phase and the second voltage of the first phase.

9. The surface maintenance machine of claim 8, wherein the tool of the maintenance head assembly comprises a brush having a first end and a second end, the first area closer to the first end than the second end of the brush, the second area closer to the second end than the first end, the first velocity being less than the second velocity.

10. The surface maintenance machine of claim 8, wherein the outlet nozzle is located a further distance from the surface than a top of the tool, such that the outlet nozzle is elevated higher than the tool.

11. The surface maintenance machine of claim 8, wherein the outlet nozzle is configured to be oriented such that the cleaning fluid exits the outlet nozzle in a direction parallel with the surface.

12. The surface maintenance machine of claim 1, wherein the outlet nozzle is arranged and configured to direct the cleaning fluid dispensed from the outlet nozzle at a positive angle relative to horizontal.

13. The surface maintenance machine of claim 8, wherein the outlet nozzle is arranged and configured to direct the cleaning fluid dispensed from the outlet nozzle at a positive angle relative to horizontal.

14. A method for operating a surface maintenance machine, the surface maintenance machine comprising a body, wheels supporting the body for movement over a surface, a maintenance head assembly that includes a tool for performing a surface maintenance operation on the surface using a cleaning fluid, a cleaning fluid source comprising a pump fluidly connected to an outlet nozzle to dispense the cleaning fluid on the tool of the maintenance head assembly, the method comprising the steps of:
wetting a first area of the tool by applying a first voltage of a first phase of a predetermined repeating cycle of voltages to the pump to cause the cleaning fluid to output from the outlet nozzle at a first velocity onto the first area of the tool;
after wetting the first area of the tool by applying the first voltage of the first phase of the predetermined repeating cycle of voltages, wetting a second, different area of the tool by applying a second voltage of the first phase of the predetermined repeating cycle of voltages to the pump to cause the cleaning fluid to output from the outlet nozzle at a second velocity onto the second, different area of the tool, wherein the second voltage is greater than the first voltage and the second velocity is different from the first velocity;

after applying the second voltage of the first phase of the predetermined repeating cycle of voltages, applying a second phase of the predetermined repeating cycle of voltages to the pump, the second phase including one or more voltages less than each of the first voltage of the first phase and the second voltage of the first phase; and after applying the second phase of the predetermined repeating cycle of voltages to the pump, repeating application of the first phase of the predetermined repeating cycle of voltages to the pump to first wet the first area of the tool by applying the first voltage of the first phase and to subsequently wet the second, different area of the tool by applying the second voltage of the first phase.

15. A surface maintenance machine that uses a cleaning fluid on a surface, comprising:

a body;

wheels supporting the body for movement over the surface;

a maintenance head assembly supported by the body and extending toward the surface and comprising a tool for performing a surface maintenance operation using the cleaning fluid;

an outlet nozzle configured to dispense the cleaning fluid from the outlet nozzle onto the tool;

a cleaning fluid source carried by the body and fluidly connected to the outlet nozzle to supply the cleaning fluid to the outlet nozzle;

a pump fluidly connected to the cleaning fluid source and configured to pump the cleaning fluid from the cleaning fluid source to the outlet nozzle; and a controller configured to apply power to the pump in a controlled manner of predetermined repeating cycles of voltages, the applied power to the pump causing the pump to pump the cleaning fluid out from the outlet nozzle and onto the tool, wherein each predetermined repeating cycle of voltages includes a first phase and a second phase that is subsequent to the first phase, the first phase including:

(i) a first voltage applied to the pump at a first time to pump the cleaning fluid out from the outlet nozzle at a first velocity onto a first area of the tool; and (ii) a second voltage applied to the pump at a second time to pump the cleaning fluid out from the outlet nozzle at a second velocity onto a second, different area of the tool, wherein the second voltage is greater than the first voltage and the second time is subsequent to the first time.

* * * * *